Nov. 18, 1969  R. H. BRODSKY  3,478,453
X-RAY FILM ILLUMINATOR
Filed March 4, 1969  4 Sheets-Sheet 1

FIG. I

INVENTOR.
RALPH H. BRODSKY
BY Philip E. Hilbert
ATTORNEY.

Nov. 18, 1969  R. H. BRODSKY  3,478,453
X-RAY FILM ILLUMINATOR
Filed March 4, 1969  4 Sheets-Sheet 2

Nov. 18, 1969     R. H. BRODSKY     3,478,453
X-RAY FILM ILLUMINATOR

Filed March 4, 1969     4 Sheets-Sheet 3

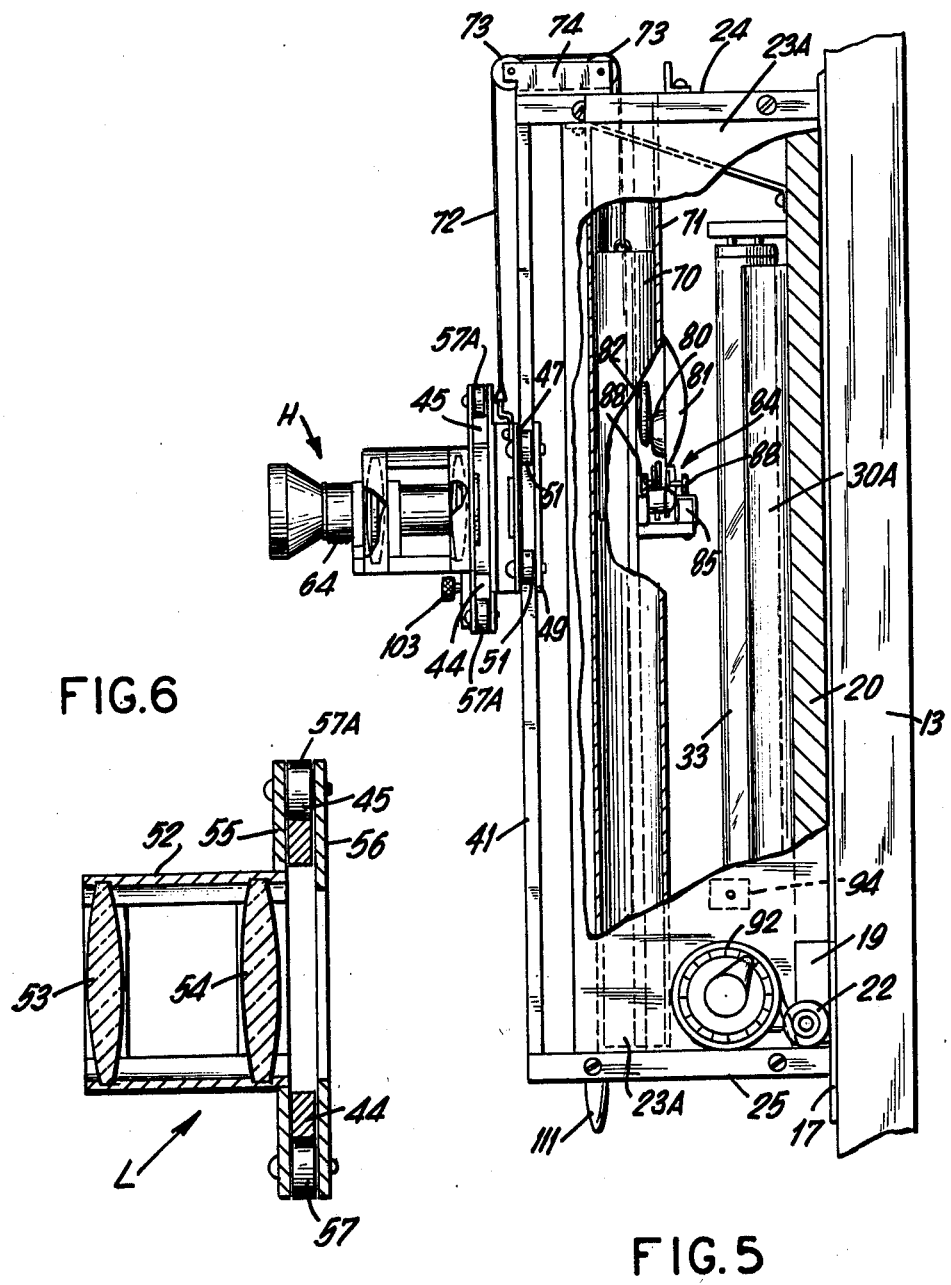

United States Patent Office 3,478,453
Patented Nov. 18, 1969

3,478,453
X-RAY FILM ILLUMINATOR
Ralph Howard Brodsky, 14 E. 81st St.,
New York, N.Y. 10028
Continuation-in-part of application Ser. No. 575,309,
Aug. 26, 1966. This application Mar. 4, 1969, Ser.
No. 806,019
Int. Cl. G09f 13/10, 13/12
U.S. Cl. 40—106.1                                      4 Claims

ABSTRACT OF THE DISCLOSURE

An X-ray film illuminator having means for viewing X-ray film under precision conditions, including scanning magnifier means movable to any desired viewing position; and combined fixed and movable illuminating means for obtaining precision illumination of selected portions of the film being viewed.

---

This is a continuation-in-part of application Ser. No. 575,309, filed Aug. 26, 1966, now abandoned.

In the examination of X-ray films, it may be desirable to concentrate the examination on localized areas of the film. Accordingly, an object of this invention is to provide an improved film illuminator which includes novel illuminating means and magnifying means which can be used conjointly to make a detailed examination of selected localized area of the film.

Another object of this invention is to provide in a device of the character described, a plurality of magnifying means varied magnifying power; the magnifying means being movably mounted on the illuminator so as to rapidly locate the magnifying means in succession in opposed relation to the localized film area which is to be examined.

A further object of this invention is to provide an X-ray film illuminator which includes movable magnifying means effective to scan the film as a whole, as well as to provide a detailed scrutiny of a selected localized area of the film, whereby complex details of bone structures or the like are readily viewed so as to be able to make precise diagnostic findings.

Still another object of this invention is to provide an improved film illuminator having fixed and movable illuminating means usable in various combinations thereof to afford optimum lighting to suit particular filmed matter, and movable magnifying means adapted to be rapidly moved for scanning the film under examination and for viewing a localized area of the film, the movable illuminating means having a fluctuating intensity to improve the depth perception of the film.

Yet another object of this invention is to provide an improved X-ray film iluminator which is of compact construction; readily and economically fabricated and lending itself to easy manipulation in use.

Other objects of this invention will in part be obvious and in part hereinafter pointed out.

Brief description of the drawings

In the drawings,

FIG. 5 is a side elevational view looking at the right hand side of FIG. 1;

FIG. 6 is a sectional view taken on the line 6—6 of FIG. 1;

Description of the preferred embodiment

Figure 1:
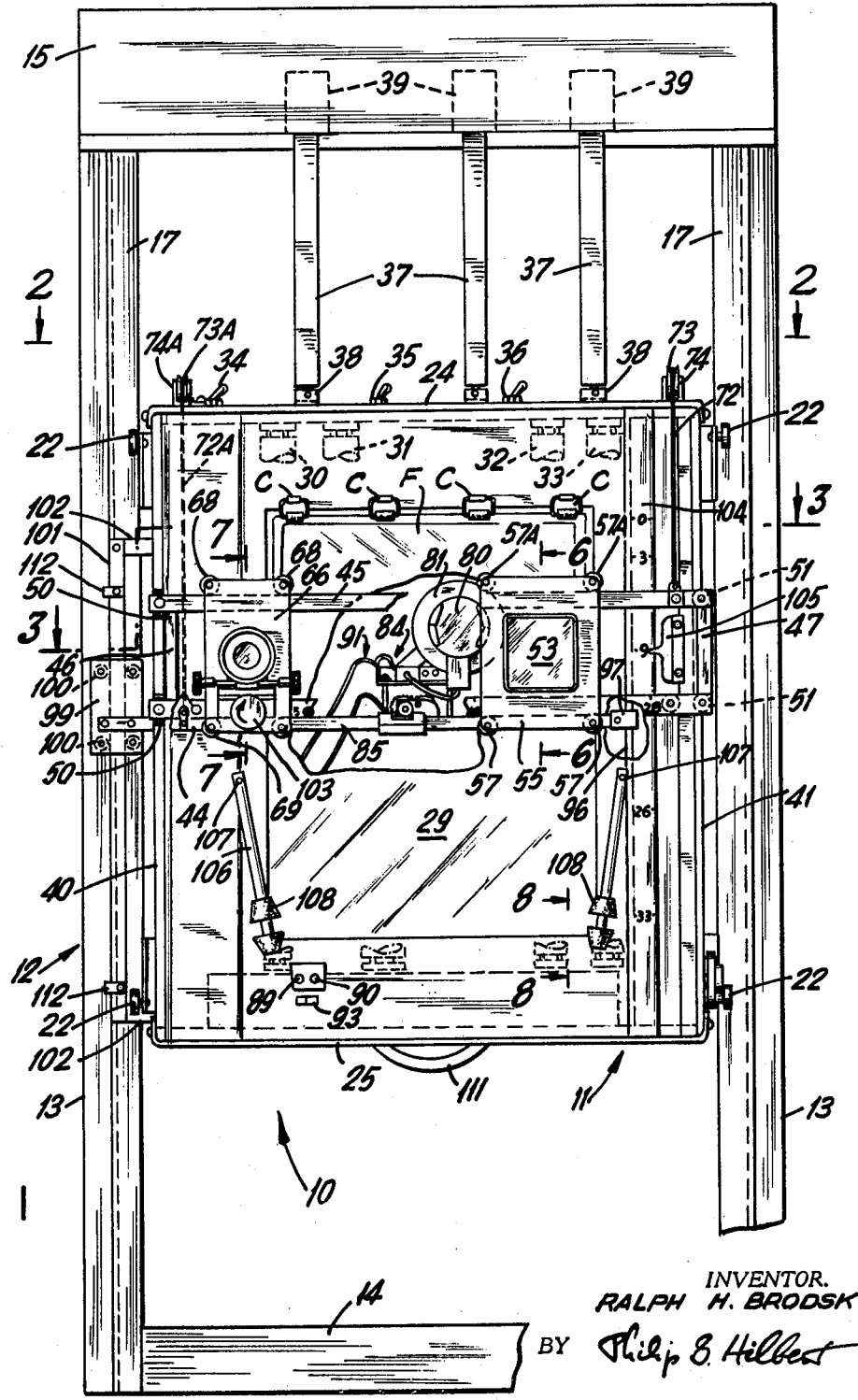
FIG. 1 is a front elevational view of an X-ray film illuminator embodying the invention.
Figure 2:
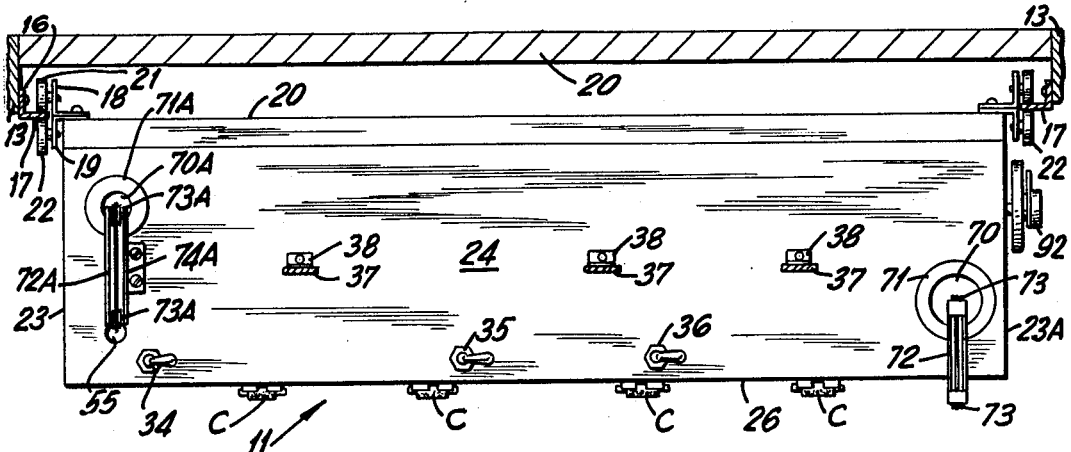
FIG 2 is a transverse sectional view taken on the line 2—2 of FIG. 1.
Figure 3:
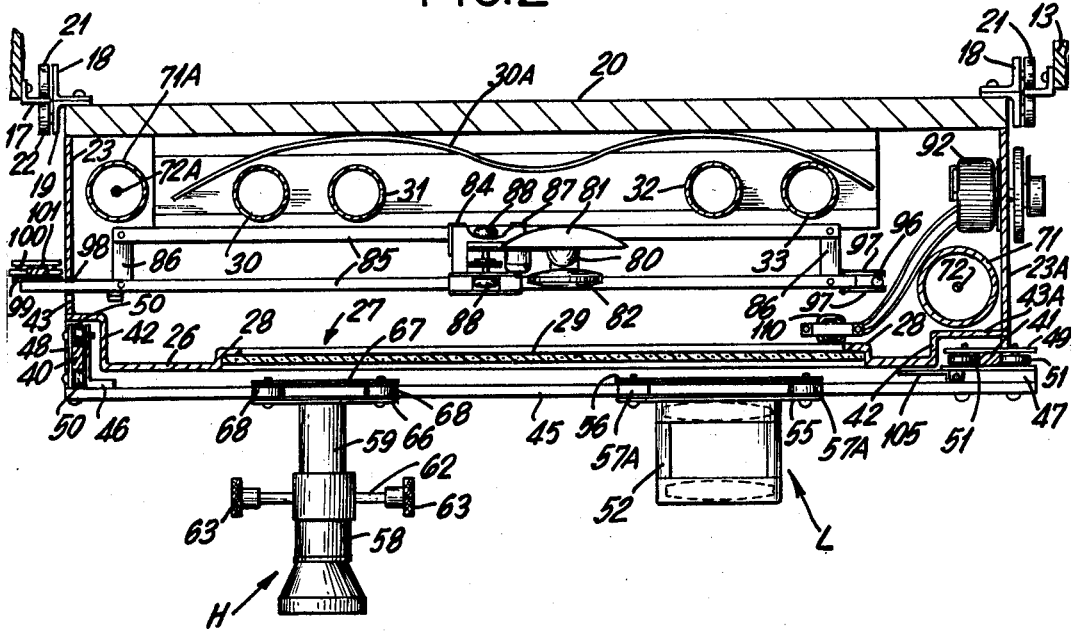
FIG. 3 is a transverse sectional view taken on the line 3—3 of FIG. 1.
Figure 4:
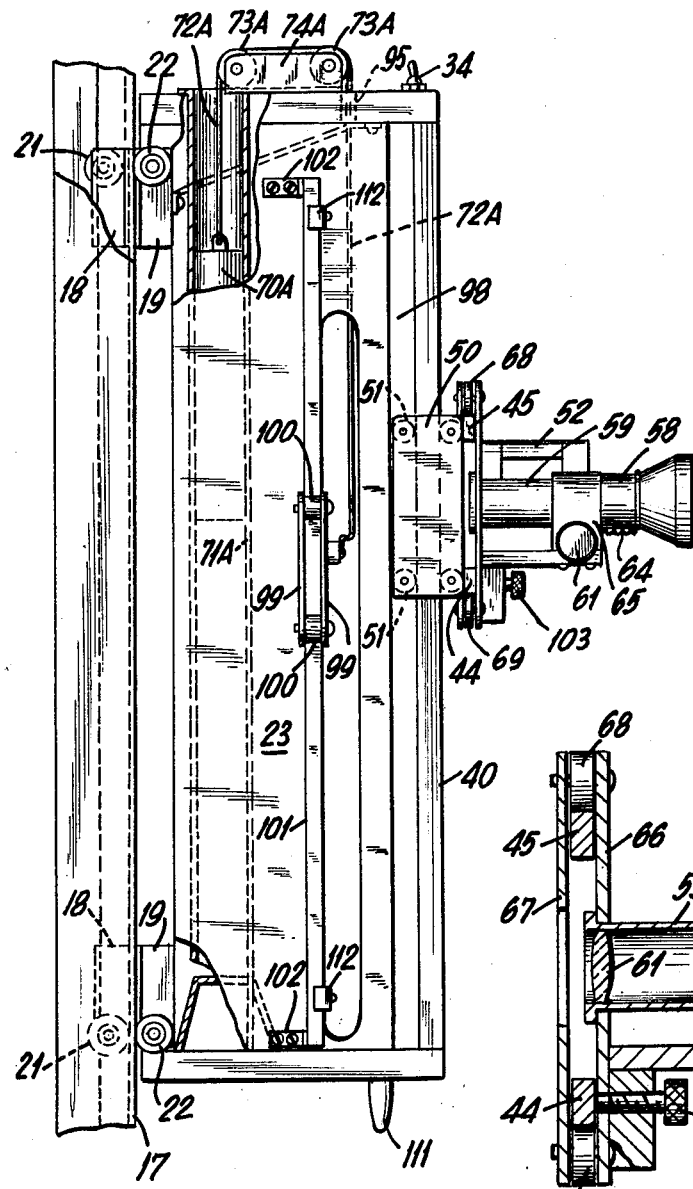
FIG 4 is a side elevational view looking at the left hand side of FIG. 1.
Figure 8:
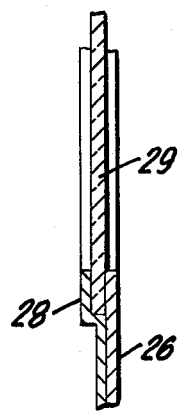
FIG. 8 is a sectional view taken on the line 8—8 of FIG. 1.
Figure 7:
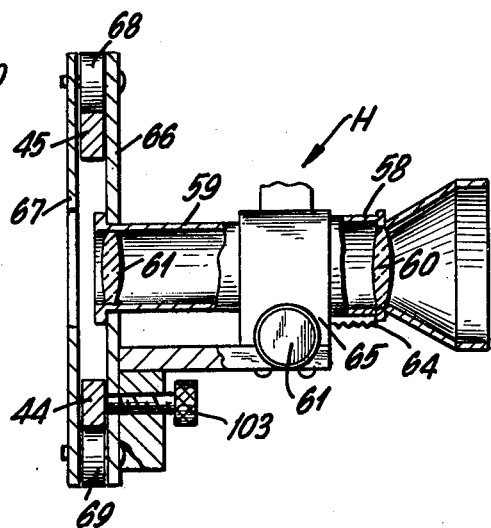
FIG. 7 is a sectional view taken on the line 7—7 of FIG. 1.

Essentially, the X-ray film illuminator of the instant invention comprises a casing carrying fixed and movable illuminating means for illuminating X-ray films mounted on a light-transmitting panel on the casing; together with a plurality of magnifier means of varied magnifying power, movably mounted on the casing for rapid horizontal and vertical movements which can be combined to quickly locate the selected magnifier means in any desired position so as to provide for detailed examination of a selected localized area of the illuminated film.

Referring in detail to the drawings, 10 designates an X-ray film illuminator embodying the invention. The same comprises an essentially rectangular casing generally indicated at 11, which is mounted for vertical move-movement on a frame generally indicated at 12; thus locating the casing 10 at any desired eye level.

The frame 12, which may be free standing or secured to a wall, as desired; comprises a pair of parallel uprights 13 interconnected at the bottom by a transverse member 14 and at the top by a transverse header assembly 15. Elongated track members 16 of angle section are fixed to the inner surface portions of uprights 13, the arm portions 17 thereof extending toward each other. Roller support angle members 18, 19 are fixed to the back surface 20 of casing 11 and projecting from the side edges therof; rollers 21, 22 being mounted on said members 18, 19 for bearing on opposite side portions of tracks 17 on members 16.

Casing 11 further comprises side walls 23, 23A extending forwardly from back panel 20; a top wall 24, a bottom wall 25; and a front wall 26 having a rectangular opening 27 defined by flanged seat portions 28 on the sides thereof, and a flanged member 28A at the bottom thereof. A light transmitting panel 29 of glass or plastic material is removably mounted in opening 27, being received in seat portions 28 and the seat formed by flanged member 28A. Thus, panel 29 may be lifted and removed to allow for access to the interior of casing 11.

Fixed illuminating means is provided within casing 11 in the form of vertically positioned fluorescent tubes 30, 31, 32 and 33 which are mounted in conventional socket means at the opposite ends thereof, said socket means being fixed within the casing. A curved reflector member 30A is disposed within casing 11 rearwardly of tubes 30–33 to reflect the light thereof toward panel 29. Toggle switches 34, 35 and 36 on top wall 24 are connected in circuit with tubes 30–33 and a source of current, not shown, to illuminate tubes 30, 31 only, which emit white light; to illuminate tubes 32, 33 only, which emit blue light; or illuminate tubes 30–33 to provide a combined light.

The casing 11 may be moved vertically to any desired eye level position, to facilitate viewing X-ray film F held against panel 29 by conventional spring clips C mounted on front wall 26 immediately above the top edge of opening 27 therein. To this end, casing 11 is suspended from header assembly 15 by straps 37 which are connected at their lower ends to brackets 38 fixed to casing wall 24; the other ends of said straps 37 being wound on spring loaded balance devices 39, of conventional construction. Accordingly, casing 11 may be readily moved vertically along track members 16 to any desired position; the casing being retained in the selected position by balance means 39.

In order to provide for detailed examination of selected areas of the illuminated film F, magnifying means is movably mounted on casing 11 to rapidly traverse the film F so as to scan the same and to bring the magnifying means into opposed relation of that localized position of film F which is to be viewed. Such magnifying means comprises a low power magnifying device L and a high power magnifying device H. The devices L and H are arranged for horizontal and vertical movement.

To this end, a pair of vertically disposed, parallel track members 40, 41 are fixed respectively to opposite sides of casing 11. Thus, front wall 26 is formed with reentrant corner portions 42, 43 on the left side thereof to receive therein member 40; while reentrant corner portions 42A, 43A on the right side thereof receive therein member 41.

A pair of horizontally disposed, parallel track members 44, 45 are interconnected at their ends by plates 46, 47. Roller brackets 48, 49 respectively mounted on plates 46, 47, carry rollers 50, 51 respectively, which engage track members 40, 41 respectively. The low power magnifying means L comprises a barrel portion 52 with opposed lenses 53, 54 fixedly mounted in opposite ends thereof; a pair of centrally apertured mounting plates 55, 56 with rollers 57, 57A interposed between the top and bottom edges thereof, are fixed to the inner end of barrel portion 52; the rollers 57, 57A engaging track members 44, 45.

The high power magnifying device H comprises telescoping barrel portions 58, 59 which carry aligned lenses 60, 61; the portions 58, 59 being longitudinally displaced relative to each other for focusing purposes, by a transverse rotatable shaft 62 having handle portions 63 at the opposite ends thereof for rotating the same and a toothed gear portion, not shown, at the center thereof for engaging rack teeth 64 on barrel portion 58. The barrel portions 58, 59 and focusing shaft 62 are mounted on a bracket 65 fixed to an apertured mounting plate 66. A second apertured mounting plate 67, aligned with plate 66, carries therebetween rollers 68, 69 at the top and bottom edges thereof, for engaging track members 44, 45.

The track members 44, 45 carrying magnifier means H, L is counterbalanced to locate the same in any desired position on track members 40, 41, by a weight 70 slidably carried in a vertical cylinder 71 located on the right hand side of casing 11. A cable 72 extends from weight 70 over guide pulleys 73 mounted in a bracket 74 on top wall 24 of casing 11 and the lower end thereof is fixed to plate 47.

In addition to the overall illumination of the film F under examination, by tubes 30–33; intense spot illumination for the localized area of the film under examination is also provided. To this end, an assembly of a spot light 80, a reflector member 81 and a focusing lens 82 is mounted on a carriage 84. Carriage 84 is arranged to traverse horizontal rail members 85 interconnected at their opposite ends by cross members 86. A miniature low speed reversible motor 87 is also mounted on carriage 84; motor 87 being connected by gearing to friction rollers 88 which engage rail members 85 to thus impart horizontal movement of carriage 84 over said rail members in either direction, as controlled by button switches 89, 90 which are in circuit with the trailing leads of motor 87, as at 91, and the source of current, to energize said motor in the desired rotational direction.

The maximum intensity of illumination of spot light 80 is controlled by a rheostat 92 on side wall 23A, in circuit with said spot light and the source of current.

It has been found that in viewing certain types of X-ray films, repeated fluctuations in the lighting intensity of spot light 80 improves the illumination of the film portions under consideration, attaining a seeming three dimensional effect with an increase in depth perception. To this end, current control means 94 in circuit with light 80 is provided, which may take the form of devices well known in the art such as a reversible motor operated rheostat or a reversible motor operated variable transformer, wherein the wattage of light 80 is repeatedly varied between a minimum of about 15 watts and a maximum of about 100 watts, with a time interval between successive minimum and maximum values of from about 0.75 to about 1.5 seconds. The motor operated devices are operative through usual limit switches to reverse their movable elements at the ends of the time intervals indicated, to obtain the desired repeated fluctuation in light intensity.

The spot light assembly is counterbalanced for controlled vertical movement by a weight 70A slidably carried in a vertical cylinder 71A located on the left hand side of casing 11. A cable 72A extends from weight 70A over guide pulleys 73A mounted on a bracket 74A fixed to casing top wall 24 and through an opening 95 therein downwardly within the casing for attachment to a left hand end portion of track means 85.

The vertical movement of the spot light assembly is guided by a vertically disposed guide rod 96 on the right hand side of casing 11 and fixed therein, which is engaged by parallel fingers 97 projecting from the right hand end of rail member 85; the left hand end of said rail member 95 projecting through a vertical slot 98 in casing side wall 23 with roller plates 99 secured thereto with rollers 100 between said plates 99. Rollers 100 engage a vertical track member 101 extending outwardly of casing wall 23 and fixed thereto by brackets 102.

The lower track member 44 may be calibrated along the length thereof to aid in locating magnifier means H, L at particular points. Magnifier means H may be locked in selected positions by a set screw 103 threaded into mounting plate 66 and bearing against track member 44. Similarly, the right hand portion of front wall 26 of casing 11 may be calibrated, as at 104; an index member 105 being fixed to plate 47, thereby locating the vertical position of the magnifier assembly relative to casing wall 26.

When viewing X-ray films of large surface area, swingable hold down members 106 may be used, said members 106 being pivoted at 107 to casing wall 26 at lower portions thereof; the members 106 terminating in resilient friction members 108 for engaging surface portions of the film.

A transformer 110 and rectifier means, not shown, provides suitable current for reversible motor 87, from the usual 110 volt A.C. power supply. A handle 111 fixed to the casing bottom wall 25, facilitates the movement of casing 11 to desired eye level positions. Vertical movement of the spot light assembly is limited by stop members 112 fixed on the track member 101 at opposite ends thereof.

It will be apparent that device 10 lends itself to illuminating and viewing various forms of X-ray films, including relatively small dental films and the larger films of general medical and surgical interest. Furthermore, such films, after mounting on plate 29, may be quickly scanned by rapid movement of the high and low magnifier devices H, L; and localized areas of the film may be subject to detailed examination by magnifier device H.

Furthermore, examination of the various types of films may be conducted under selected illuminating conditions including one or more of the fluorescent tlubes 30–33; the spot light 80; or any combination thereof.

What is claimed is:

1. In an X-ray film illuminator, a casing, a wall portion of said casing having an opening therein, a light transmitting panel mounted in the opening of said wall portion, means on said casing for removably mounting an X-ray film over the front face of said panel, fixed illuminating means within said casing for illuminating the mounted film, means for scanning and viewing said illuminated film, said scanning and viewing means comprising at least one magnifier means, means for mounting said magnifier means on said casing for horizontal and vertical movement relative to the outer surface of said panel whereby said magnifier means may be moved in traversing relation to said film to scan said film and may be brought into opposed relation to a selected area of said film for detailed viewing of said selected area of the film, spot electric illuminating means movably mounted within said casing, means for moving said spot illuminating means to positions for further illuminating said selected area of the film, and variable current control means for controlling said spot illuminating means for continuously alternating at a predetermined frequency the illumination intensity thereof between predetermined minimum and maximum values while viewing the selected area of the film.

2. An illuminator as in claim 1 wherein said variable current control means provides illumination continuously alternating between about 15 watts and about 100 watts, with time intervals between said minimum wattage and said maximum wattage of from about 0.75 to about 1.5 seconds.

3. An illuminator as in claim 1 wherein said last mentioned means comprises reversible motor operated variable transformer means.

4. Illuminator as in claim 1, wherein said fixed illuminating means comprises illuminating means providing illumination of one color and illuminating means providing illumination of another color, and control means for said fixed illuminating means to selectively provide illumination of either color or a combination of said colors.

References Cited

UNITED STATES PATENTS

| | | | |
|---|---|---|---|
| 2,943,410 | 7/1960 | Haggar | 40—106.1 |
| 3,359,669 | 12/1967 | Masters | 40—106.1 |

FOREIGN PATENTS

| | | |
|---|---|---|
| 698,785 | 10/1953 | Great Britain |

EUGENE R. CAPOZIO, Primary Examiner

R. CARTER, Assistant Examiner